(No Model.)  3 Sheets—Sheet 1.

F. W. WEHRLE & W. UNGER.
APPARATUS FOR SEPARATING AND AMALGAMATING ORES.

No. 263,635. Patented Aug. 29, 1882.

Attest

Inventor
Fredrick W. Wehrle
William Unger
By H. Harrison
Attorney (No Model.) 3 Sheets—Sheet 2.
F. W. WEHRLE & W. UNGER.
APPARATUS FOR SEPARATING AND AMALGAMATING ORES.
No. 263,635. Patented Aug. 29, 1882.
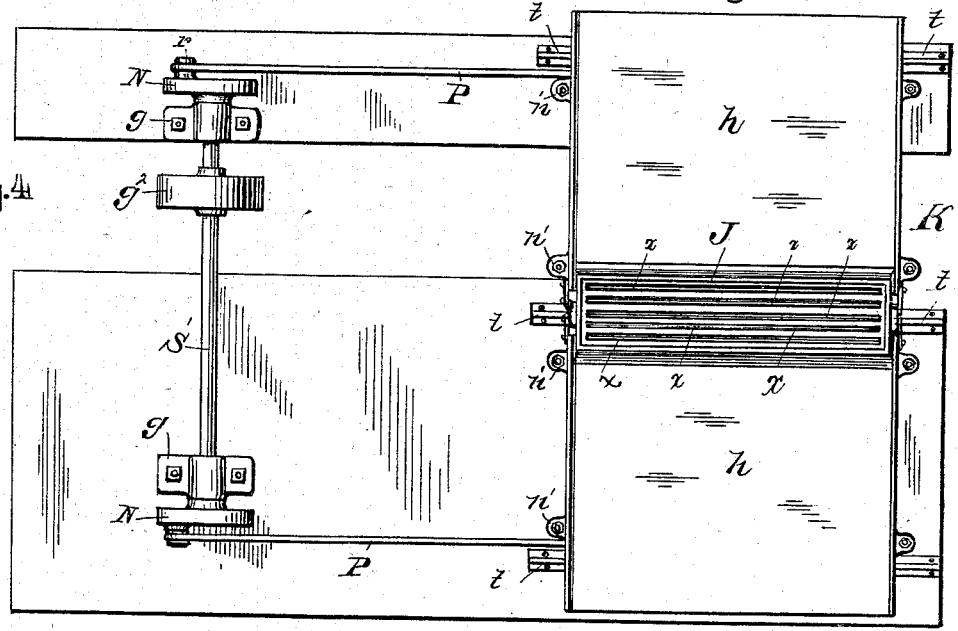
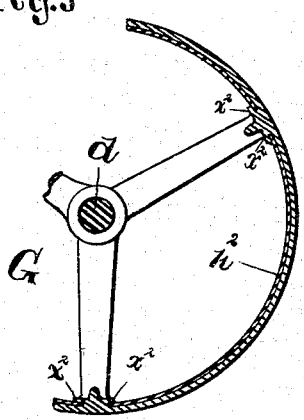
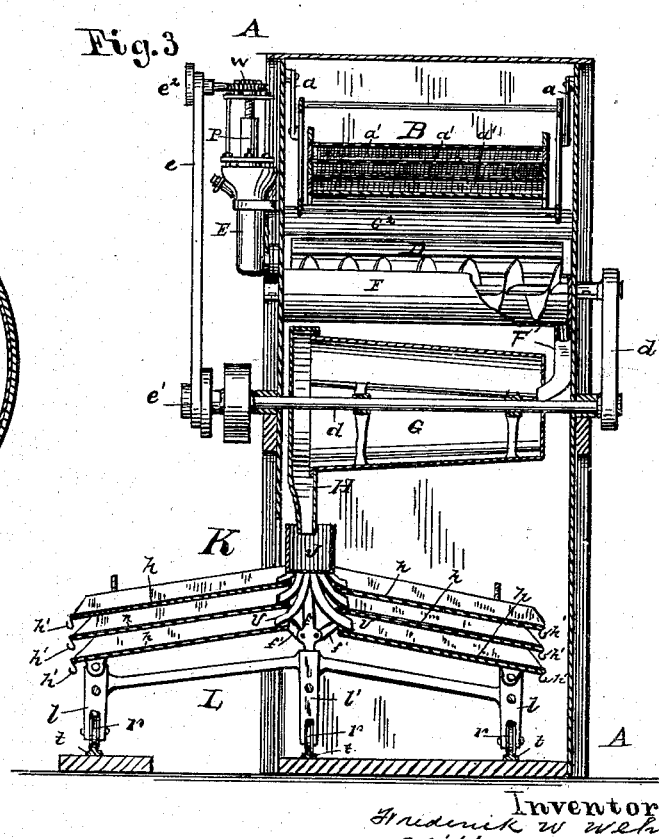

(No Model.) 3 Sheets—Sheet 3.
F. W. WEHRLE & W. UNGER.
APPARATUS FOR SEPARATING AND AMALGAMATING ORES.
No. 263,635. Patented Aug. 29, 1882.
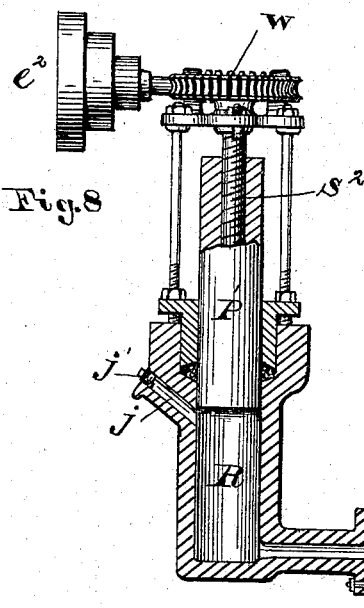
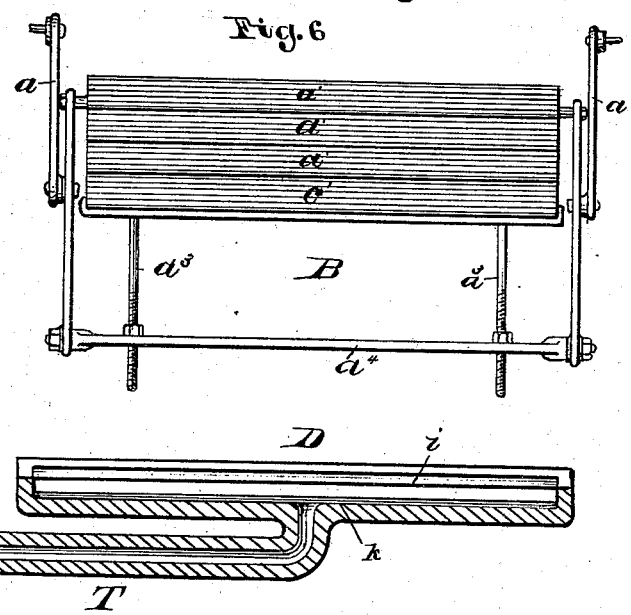
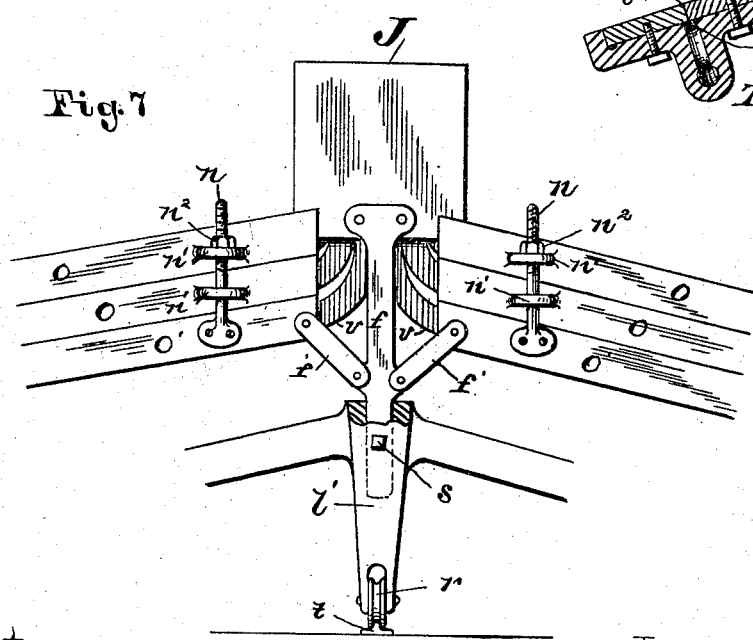
Attest:
Inventor
Frederick W. Wehrle
William Unger
BY
H. Harrison
Attorney

UNITED STATES PATENT OFFICE.

FREDRICK W. WEHRLE AND WILLIAM UNGER, OF CHICAGO, ILLINOIS.

APPARATUS FOR SEPARATING AND AMALGAMATING ORES.

SPECIFICATION forming part of Letters Patent No. 263,635, dated August 29, 1882.

Application filed March 25, 1882. (No model.)

*To all whom it may concern:*

Be it known that we, FREDRICK W. WEHRLE and WILLIAM UNGER, citizens of the United States of America, residing at Chicago, in the county of Cook and State of Illinois, have invented certain new and useful Improvements in Apparatus for Separating and Amalgamating Ores, of which the following is a specification.

Our invention relates to an apparatus for separating gold or other precious metals from sand and quartz.

The object of this invention is to provide an amalgamator so constructed and arranged that gold or other precious metals may be separated from sand or from crushed quartz without the use of water.

To this end our invention consists in an amalgamator by which the sand or quartz containing the precious metals is carefully screened and then thoroughly mixed with mercury, and the precious metal collected in an amalgamated form by amalgamated plates, as hereinafter fully described.

Figure 1:
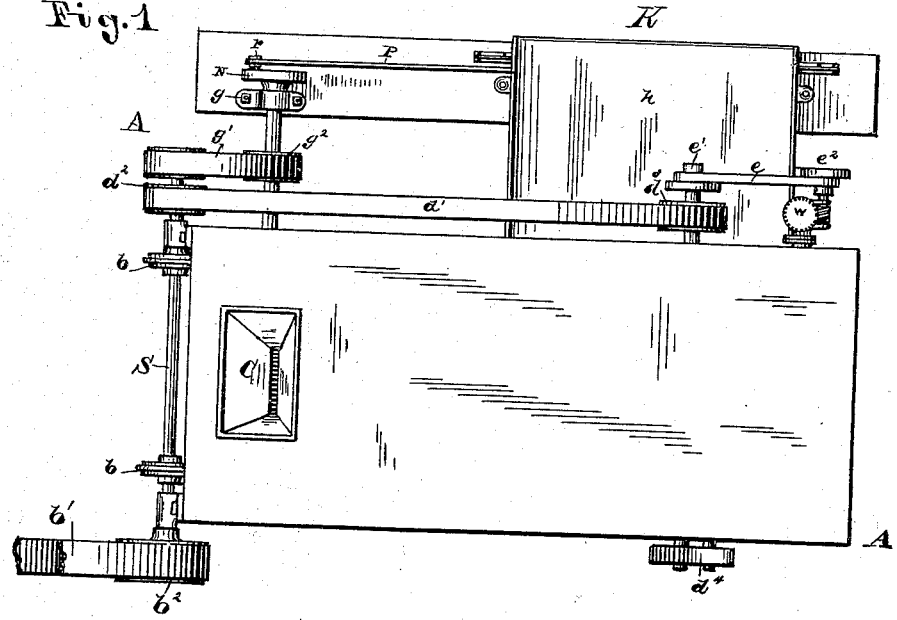
Figure 2:
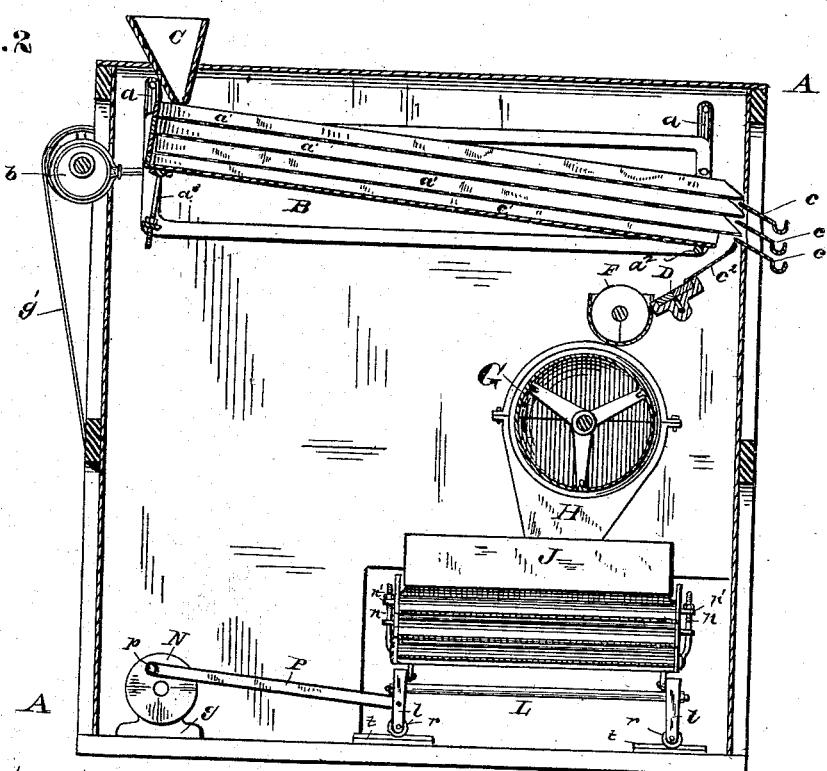

In the accompanying drawings, Figure 1 is a plan view of our improved amalgamator; Fig. 2, a vertical longitudinal section; Fig. 3, a vertical cross-sectional view of the same. Fig. 4 is a plan view of the frame containing the amalgamated plates; and Figs. 5 to 9, inclusive, detailed views of the various parts referred to hereinafter.

Like parts are referred to by similar letters of reference throughout the several views.

In the drawings, A A represent the main frame or casing, within which the various parts are inclosed.

Inside the casing A A, near the top, and suspended from the sides thereof by arms $a$, is a frame, B, in which is a series of screens, $a'$ $a'$ $a'$, supported at one end on a cross-piece, $a^2$, and at the other by adjustable rods $a^3$, extending from cross-bar $a^4$. (See Figs. 2 and 6.) The frame B, containing the screens $a'$ $a'$ $a'$, is vibrated by means of eccentrics $b$, secured on a shaft, S, supported in suitable bearing near the top of one end of the main frame A A, and rotated by means of a belt, $b'$, running on pulley $b^2$, or in any other suitable manner.

Directly over the adjustable end of the screens $a'$ is a hopper, C, into which the sand containing the precious metal to be amalgamated is placed. From the hopper C the sand falls into the first of the screens $a'$, which is very coarse, and by means of the vibrations imparted to said screens by eccentrics $b$ $b$ passes through and falls onto the second of the sieves, which is finer, and so on, until the proper fineness is secured, the tailings from each passing off at the end of the screens, and being carried away by troughs $c$. The screened sand falls into a box, $c'$, under the screens $a'$, and slides down and falls on a chute, $c^2$, the proper pitch being secured for the screens $a'$ and box $c'$ by means of the adjustable rods $a^3$. From the chute $c^2$ the sand passes over a mercury-table, D, through which mercury is continually forced by a force-pump, E, in the manner hereinafter more fully described. Here a certain amount of mercury is mixed with the sand and falls with it into a conveyer, F, by which it is conveyed to and falls in a spout, F', which leads into a conveyer, G, the outer shell of which has the form of a truncated cone and is supported upon an axle, $d$, journaled at each end, and in suitable bearings and rotated from shaft S through the agency of a belt, $d'$, running over suitable pulleys, $d^2$ and $d^3$.

The conveyer F, referred to above, receives its motion from axle $d$ of conveyer G by means of a belt, $d^4$. (See Figs. 1 and 3.) The mercury and sand, by the action of conveyer F and the revolution of the conveyer G, are thoroughly mixed together, and the mercury amalgamates the gold, silver, or other precious metal the sand may contain. From the conveyer G the sand and the amalgamated metal fall through a spout, H, into box or hopper, J, at the top of the vibrator K, which contains the amalgamated plates, on which the amalgam is collected, as hereinafter specified.

The vibrator K consists of two sets of pans, O O', placed one upon the other, the lower ones of each set being hinged at each side of the outer ends to a frame, L, which is supported on lugs $l$ $l'$, provided with rollers $r$, running on suitable tracks, $t$, the inner ends of said pans being supported by adjustable rods $f$, to which they are connected by links $f'$. The lower ends of rods $f$ slide vertically in sockets in the upper ends of the center legs, $l'$, of frame L, and are held in any desired position by set-screws $s$. (See Figs. 3 and 7.) The rods $f$ are extended up to and secured at their upper ends to the ends of the box or hopper J. By this arrangement the pitch of the pans O O' from the center outward may be varied at will. The frame L of vibrator K is connected at each end by connecting-rods P P to wrist-pins $p$ $p$ in crank-wheels N N on each end of a shaft, S', running in suitable bearings, $g$ $g$, and rotated by a belt, $g'$, from main shaft S.

The pans O of each set referred to above are held in their position on the lower pans, O', by means of lugs $n'$, in each of which is an opening through which extends a rod or pin, $n$, secured at the lower end to the lower pan, O', and provided at the top with a nut, $n^2$, which serves to hold the whole firmly together.

In the bottom of the pans O and O' are placed amalgamated plates $h$, the outer ends of which project beyond the bottom of the pans O O', and are bent up, forming cups $h'$, (see Fig. 3,) said cups being bent under the end of pans in such a manner that the sand in falling from the pans falls clear of said cups.

The bottom of the box or hopper J is provided with a number of openings, $x$, corresponding with the number of pans O O'. From each of said openings a spout or chute, $v$, leads to one of the pans O. The sand and amalgam, having arrived in the box J, (of vibrator K, as before described,) is by the vibration imparted thereto through the agency of crank-wheels N and connection P sifted gradually through the various openings $x$ in the bottom of said box, and is conveyed by chutes $v$ to the various pans O containing the plates $h$, and by the vibrating movement of said pans is spread out in a thin sheet over a large amount of amalgamated surface, which attracts and retains the amalgam, while the sand is left free to pass off at the outer end of the pans. Should the plates $h$ become thickly coated with the amalgam, it will, from its nature, flow slowly down, following the curve of the plates, and become deposited in the cups $h'$, while the sand falls over said cups onto the floor of the machine. In order to increase the amalgamated surface, and to insure the collection of all the amalgam, we also place amalgamated plates $h^2$ in the conveyer G, said plates being slipped lengthwise in grooves or ways $x^2$, provided on the inner surface of the said conveyer for this purpose, as shown in Fig. 5.

The mercury-pump E, referred to above and shown in detail, Figs. 8 and 9, is constructed as follows:

R is the barrel of the pump, which is fitted with a plunger, P', made tight by the use of an ordinary stuffing-box, and bored out to receive a screw, $S^2$, on the top of which is a worm-gear, W, the worm of which is driven by a belt, $e$, running from cone-pulleys $e'$ on the axle $d$ of the conveyer G to similar pulleys, $e^2$, on the said worm, thus furnishing the means of varying the speed of the said worm and gear. The table D, over which the sand passes, is provided with two steel plates, $i$ $i$, which fit closely in the recess provided for them in the table D, and adjusted by means of screws $i^3$, closely together, leaving a fine opening, $i^2$, through which the mercury is forced. Directly under the opening $i^2$, between the plates $i$, is a groove, $k$, extending the entire length of the plates, into which leads a pipe, T, from the bottom of the barrel R of the pump. The barrel R of the pump is provided with opening $j$, closed by a plug, $j'$.

The operation is as follows: The plunger is raised up to its limit, and the barrel R and pipe T filled with mercury through the opening $j$, which is thus tightly closed by the plug $j'$. The machine being set in operation, the plunger, by means of the worm-gear W and screw $S^2$, is moved gradually downward, forcing the mercury slowly through the opening $i^2$, between the plates $i$, where it mixes with the descending sand, as before described, the speed of the plunger $p^2$ and the quantity of mercury used being varied by the cone-pulleys $e^2$ and $e^3$.

It will be seen that a machine constructed as above described is quite simple in its operation, and dispenses with the use of water as heretofore employed for amalgamating purposes.

Having thus described our invention, what we claim as new, and desire to secure by Letters Patent, is—

1. The combination of the frame L, pans O O', hopper J, provided with spouts $v$ $v'$, crank-wheel N, and connection P, substantially as shown and described.

2. The combination, with the pans O O', arranged in a double series, and each pan provided with an amalgamated plate, $h$, of the box or hopper J, having a number of openings corresponding with the number of pans, and the spouts $v$ $v'$, connecting the hopper with the pans, substantially as shown and described.

3. The combination of the box J, pans O O', connected as described, frame L, adjustable rods $f$, provided with means for holding the same, and the connections $f'$ $f'$, substantially as shown and described.

In testimony whereof we affix our signatures in presence of two witnesses.

FREDRICK W. WEHRLE.
WILLIAM UNGER.

Witnesses:
CHAS. KRESSMAN,
FRANK JOHNSON.